(12) United States Patent
Ohta

(10) Patent No.: US 8,717,441 B2
(45) Date of Patent: May 6, 2014

(54) METHOD OF AUTOMATICALLY TRACKING AND PHOTOGRAPHING CELESTIAL OBJECTS AND CAMERA EMPLOYING THIS METHOD

(75) Inventor: Makoto Ohta, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 400 days.

(21) Appl. No.: 13/109,247

(22) Filed: May 17, 2011

(65) Prior Publication Data

US 2011/0285855 A1 Nov. 24, 2011

(30) Foreign Application Priority Data

May 19, 2010 (JP) .................................. 2010-115429

(51) Int. Cl.
*H04N 5/225* (2006.01)
*G01S 3/782* (2006.01)

(52) U.S. Cl.
CPC ...................................... *G01S 3/782* (2013.01)
USPC ........................................... 348/169; 348/143

(58) Field of Classification Search
CPC ........................... G01S 3/7864; H04N 5/23258
USPC ......... 348/169, 208.6, 208.2, 216.1, E05.024, 348/E5.034, E5.046
See application file for complete search history.

(56) References Cited

U.S. PATENT DOCUMENTS

| | | | | |
|---|---|---|---|---|
| 5,365,269 A | * | 11/1994 | Holmes et al. | ................. 348/297 |
| 6,072,571 A | * | 6/2000 | Houlberg | ................. 356/139.04 |
| 6,563,636 B1 | * | 5/2003 | Baun et al. | .................... 359/429 |
| 7,057,645 B1 | * | 6/2006 | Hara et al. | ................. 348/208.6 |
| 7,400,823 B2 | * | 7/2008 | Kakiuchi | ......................... 396/55 |
| 7,580,620 B2 | * | 8/2009 | Raskar et al. | .................... 396/55 |
| 2003/0202682 A1 | | 10/2003 | Yanagisawa et al. | |
| 2006/0284495 A1 | | 12/2006 | Seo et al. | |
| 2007/0147822 A1 | * | 6/2007 | Tanaka | .......................... 396/158 |
| 2008/0174678 A1 | * | 7/2008 | Solomon | .................. 348/231.99 |

(Continued)

FOREIGN PATENT DOCUMENTS

| | | |
|---|---|---|
| JP | 6-130446 | 5/1994 |
| JP | 2000-224470 | 8/2000 |

(Continued)

OTHER PUBLICATIONS

U.S. Appl. No. 13/114,320 to Makoto Ohta, filed May 24, 2011.

(Continued)

*Primary Examiner* — Jayanti K Patel
*Assistant Examiner* — Reza Aghevli
(74) *Attorney, Agent, or Firm* — Greenblum & Bernstein, P.L.C.

(57) ABSTRACT

A method of automatically tracking and photographing a celestial object so that the celestial object image, which is formed on an imaging surface of an image sensor via a photographing optical system, becomes stationary relative to a predetermined imaging area of the imaging surface of the image sensor during a tracking and photographing operation. The method includes performing a preliminary photographing operation at a predetermined preliminary-photographing exposure time with the photographic apparatus directed toward the celestial object and with a celestial-body auto tracking action suspended to obtain a preliminary image before automatically tracking and photographing the celestial object, calculating a moving direction and a moving speed of the celestial object image from the preliminary image that is obtained by the preliminary photographing operation, and automatically tracking and photographing the celestial object based on the moving direction and the moving speed of the celestial object image.

14 Claims, 9 Drawing Sheets

(56) References Cited

U.S. PATENT DOCUMENTS

| | | | |
|---|---|---|---|
| 2008/0252743 A1* | 10/2008 | Ueda | 348/222.1 |
| 2009/0051772 A1* | 2/2009 | Rhoads | 348/187 |
| 2010/0103251 A1 | 4/2010 | Numako | |

FOREIGN PATENT DOCUMENTS

| | | | | |
|---|---|---|---|---|
| JP | 2003-259184 | * | 9/2003 | H04N 5/225 |
| JP | 2004-201056 | | 7/2004 | |
| JP | 2006-093817 | | 4/2006 | |
| JP | 2006-279135 | | 10/2006 | |
| JP | 2006-287375 | | 10/2006 | |
| JP | 2007-25616 | | 2/2007 | |
| JP | 2007-89087 | | 4/2007 | |
| JP | 2008-17223 | | 1/2008 | |
| JP | 2008-289052 | * | 11/2008 | H04N 5/225 |

OTHER PUBLICATIONS

U.S. Appl. No. 13/117,517 to Makoto Ohta, filed May 27, 2011.
International Search Report, dated Jun. 7, 2011 along with an English translation thereof.
International Search Report, dated Jul. 24, 2012 along with an English translation thereof.

* cited by examiner

METHOD OF AUTOMATICALLY TRACKING AND PHOTOGRAPHING CELESTIAL OBJECTS AND CAMERA EMPLOYING THIS METHOD

BACKGROUND OF THE INVENTION

1. Field of the Invention

The present invention relates to a method of automatically tracking and photographing celestial objects which enables the capture of a freeze-frame picture of a celestial object(s) in long exposure astrophotography, and further relates to a camera employing this method.

2. Description of the Related Art

If long exposure astrophotography is carried out with a fixed camera, added light of stars during a long exposure form straight or curved light trails in the captured image, since celestial objects move relative to the camera due to the earth's rotation (diurnal motion). To carry out a long exposure in order to photograph a celestial object so that the celestial object appears to be still (stationary) relative to a photosensitive film or an image sensor (image pickup device), an equatorial equipped with an auto tracking system is generally used.

In recent years, a method of obtaining a still image of celestial objects such as planets and stars in long exposure astrophotography has been proposed in which a celestial object(s) is photographed a plurality of times with a fixed digital camera without using an equatorial, and thereafter, the images thus obtained at the plurality of times are added while correcting the positions of the celestial object(s) using data on the obtained images (see Japanese Unexamined Patent Publications Nos. 2006-279135 and 2003-259184).

However, an equatorial equipped with an auto tracking system is generally expensive, heavy and difficult to handle; in addition, it is essential to carry out a polar alignment procedure in which the polar axis of the equatorial is brought into alignment with the Pole Star (regarded as substantially the same as the North Celestial Pole (NCP)). The type of digital camera (disclosed in Japanese Unexamined Patent Publications Nos. 2006-279135 and 2003-259184) which synthesizes a plurality of images has inferior image registration accuracy and is slow in image processing speed, and therefore, it is practically impossible to synthesize a plurality of astronomical images using only such a type of digital camera while performing tracking astrophotography.

SUMMARY OF THE INVENTION

The present invention provides a method of automatically tracking and photographing celestial objects which enables the capture of a still image of a celestial object(s) such as a star or a planet in a state where each celestial object appears stationary with respect to a fixed point on the (rotating) Earth in long exposure astrophotography with a camera directed toward an arbitrary-selected celestial object and fixed with respect to the ground (earth) and without using an equatorial (which is generally expensive and requires complicated adjustments). The present invention also provides a camera that employs this method of automatically tracking and photographing celestial objects.

According to an aspect of the present invention, a method of automatically tracking and photographing a celestial object is provided which moves relative to a photographic apparatus due to diurnal motion so that a celestial object image, which is formed on an imaging surface of an image sensor via a photographing optical system, becomes stationary relative to a predetermined imaging area of the imaging surface of the image sensor during a tracking and photographing operation. The method includes performing a preliminary photographing operation at a predetermined preliminary-photographing exposure time with the photographic apparatus directed toward the celestial object and with a celestial-body auto tracking action suspended to obtain a preliminary image before automatically tracking and photographing the celestial object, calculating a moving direction and a moving speed of the celestial object image from the preliminary image that is obtained by the preliminary photographing operation, and automatically tracking and photographing the celestial object based on the moving direction and the moving speed of the celestial object image.

It is desirable for the automatically tracking and photographing to include automatically tracking and photographing while moving at least one of the predetermined imaging area of the imaging surface of the image sensor and an image-forming position of the celestial object image relative to the photographic apparatus based on the calculated the moving direction and the moving speed of the celestial object image.

It is desirable for the calculating of the moving direction and the moving speed of the celestial object image from the preliminary image to include calculating from positions of first images of at least two celestial objects which are formed on the imaging surface at a commencement of the preliminary photographing operation and positions of second images of the at least two celestial objects which are formed on the imaging surface after a lapse of a predetermined period of time from the commencement of the preliminary photographing operation.

In the case where points S1 and S2 designate the positions of the first images of the two celestial objects, points S1' and S2' designate the positions of the second images of the two celestial objects, point O designates an arbitrary point on the preliminary image at the commencement of the preliminary photographing operation that is different from the points S1 and S2, and Δt designates a period of time from the commencement of the preliminary photographing operation until a termination thereof, it is desirable for the calculating of the moving direction and the moving speed of the celestial object image from the preliminary image to include calculating an angle $\Delta\theta$ between a straight line passing through points S1 and S2 and a straight line passing through points S1' and S2', wherein the angle $\Delta\theta$ defines an angle of rotation of the celestial object image, and calculating a distance between the point O and a point O' of three points forming a triangle $\Delta S1'S2'O'$ that is congruent to a triangle $\Delta S1S2O$ defined by the points S1, S2 and O as an image shifting amount of the celestial object image.

It is desirable for the method to include calculating and determining a movement amount and an angle of rotation of the celestial object image which occur during an actual-photographing exposure time, which exceeds the preliminary-photographing exposure time, by calculating an average of movement amounts and rotation angles of the two celestial object images that are obtained by performing the preliminary photographing operation a plurality of times.

It is desirable for the method to include calculating and determining a movement amount and an angle of rotation of the celestial object image which occur during an actual-photographing exposure time, which exceeds the preliminary-photographing exposure time, from a rate of change in movement amounts and rotation angles of the two celestial object images that are obtained by performing the preliminary photographing operation a plurality of times.

In the case where, in an X-Y coordinate system in which horizontal and vertical axes of the imaging surface having a rectangular shape represent an X-axis and a Y-axis, respectively, points S1 and S2 designate the positions of the first images, points S1' and S2' designate the positions of the second images after a lapse of a time Δt from a commencement of a preliminary photographing operation, points S1" and S2" after a lapse of a time (2×Δt) from a commencement of the preliminary photographing operation, and point O designates an arbitrary point on the preliminary image at the commencement of the preliminary photographing operation that is different from the points S1 and S2, it is desirable for the calculating of the moving direction and the moving speed of the celestial object image from the preliminary image to include determining coordinates Xt and Yt of predicted center points O' and O", ... of the imaging surface after a lapse of an exposure time T from the point O from the following equations:

$$Xt = X0 - r \times \sin(\Theta + \Delta\phi/\Delta t \times T)$$

$$Yt = Y0 + r \times \cos(\Theta + \Delta\phi/\Delta t \times T)$$

wherein X0 and Y0 designate x and y coordinates of a point of intersection G between a perpendicular bisector of a segment O-O' and a perpendicular bisector of a segment O'-O", and Θ designates an angle between a straight line which passes through the intersection point G and is parallel to the Y-axis and a straight line G-O which connects the point O and the intersection point G.

It is desirable for the performing of the preliminary photographing operation to include one of performing a plurality of exposures at predetermined intervals, and photographing at least two images and synthesizing the two images into a single image.

It is desirable for the performing of the preliminary photographing operation to include one of temporarily opening an aperture of an adjustable diaphragm of a photographing lens, in which the photographing optical system is provided, and temporarily increasing a photographic sensitivity to increase an amount of exposure at each of a commencement of the preliminary photographing operation and a termination thereof during the preliminary photographing operation.

It is desirable for the performing of the preliminary photographing operation to include one of temporarily repeatedly opening an aperture of an adjustable diaphragm of a photographing lens, in which the photographing optical system is provided, and temporarily repeatedly increasing a photographic sensitivity to increase an amount of exposure repeatedly at predetermined intervals.

In an embodiment, a camera employing the above-described method is provided, including a photographing system which performs the preliminary photographing operation and automatically tracks and photographs the celestial object, and a controller which performs the calculating step.

It is desirable for the photographing system to include the photographing optical system which includes a photographing lens and an adjustable diaphragm, wherein the controller controls an aperture size of the adjustable diaphragm.

It is desirable for the photographing system to include an image-sensor mover which linearly moves the image sensor in directions orthogonal to an optical axis of the photographing optical system and rotates about an axis parallel to the optical axis based on the moving direction and the moving speed of the celestial object image.

In the case where the photographic apparatus is provided with a decentering adjustment function, the "optical axis of the photographing optical system" refers to the optical axis of the photographing optical system in an initial state before decentering is carried out.

According to the method of automatically tracking and photographing celestial objects, and a camera that employs this method, according to the present invention, it is possible to capture a still image of a celestial object(s) in a state where each celestial object appears stationary with respect to a fixed point on the rotating Earth in long exposure astrophotography with a camera directed toward an arbitrary-selected celestial object and fixed with respect to the ground (earth) and without using an equatorial, which is generally expensive and requires complicated adjustments.

The present disclosure relates to subject matter contained in Japanese Patent Application No. 2010-115429 (filed on May 19, 2010) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENTS

Figure 1:
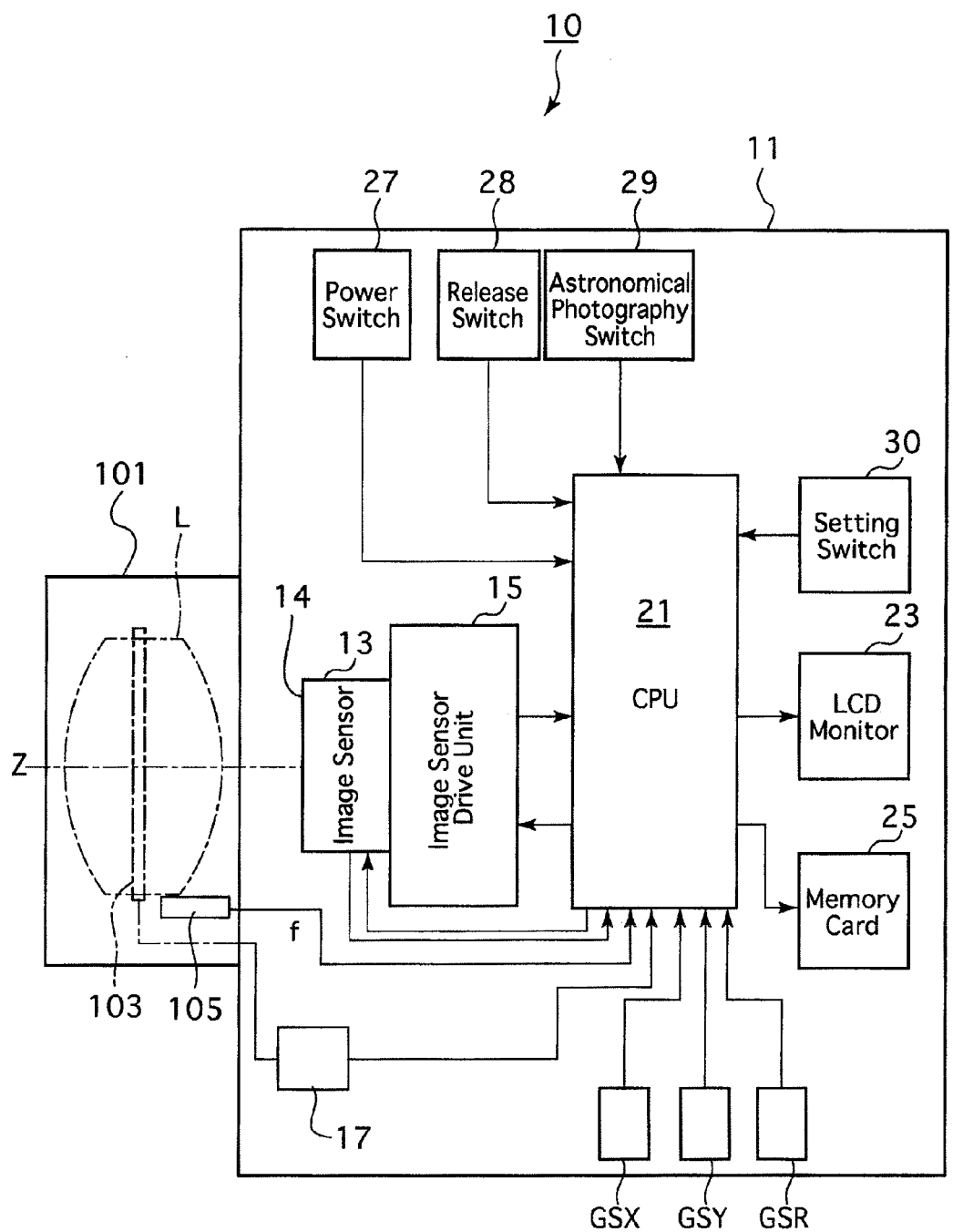
FIG. 1 is a block diagram illustrating main components of an embodiment of a digital camera which is capable of automatically tracking and photographing celestial objects according to the present invention.

An embodiment of a method of automatically tracking and photographing celestial objects according to the present invention and an embodiment of a digital camera 10 employing this method will be discussed hereinafter. As shown in FIG. 1, the present embodiment of the digital camera (photographic apparatus) 10 is provided with a camera body 11 and a photographing lens 101 (that contains a photographing optical system L). The digital camera 10 is provided, in the camera body 11 behind the photographing optical system L, with an image sensor 13 serving as an image pickup device. An optical axis Z of the photographing optical system L is orthogonal to an imaging surface (photosensitive surface) 14 of the image sensor 13. The image sensor 13 is mounted onto an image sensor drive unit (image sensor mover/anti-shake unit) 15. The image sensor drive unit 15 is provided with a fixed stage, a movable stage which is movable relative to the fixed stage, and an electromagnetic circuit for moving the movable stage relative to the fixed stage. The image sensor 13 is held by the movable stage. The image sensor 13 (the movable stage) is controlled and driven to linearly move in desired directions orthogonal to the optical axis Z at a desired moving speed and to rotate about an axis parallel to the optical axis Z (instantaneous center at some point in a plane orthogonal to the optical axis Z) at a desired rotational speed. This type of image sensor drive unit (15) is known in the art as an anti-shake unit of an image shake corrector (shake reduction system) incorporated in a camera disclosed in, e.g., Japanese Unexamined Patent Publication No. 2007-25616.

The photographing lens 101 is provided with a diaphragm (adjustable diaphragm) 103 in the photographing optical system L. The f-number (degree of opening/closing the diaphragm 103) is controlled by a diaphragm drive control mechanism 17 provided in the camera body 11.

The digital camera 10 is provided with a CPU (controller) 21 which controls the overall operation of the digital camera 10. The CPU 21 drives the image sensor 13 and controls the operation thereof, and performs a signal processing operation on an image signal of a captured object image to display this image on an LCD monitor 23, and writes image data of this image onto a removable memory card 25. The driving control of the image sensor 13 by the CPU 21 includes the setting of a driving frequency and a photographic sensitivity (ISO speed) of the image sensor 13. To detect vibrations applied to the digital camera 10 when the image sensor drive unit 15 is used as an anti-shake unit, the CPU inputs focal length information f concerning the photographing lens 101 from a focal length detector 105 provided in the photographing lens 101 and also inputs signals detected by an X-direction gyro sensor GSX, a Y-direction gyro sensor GSY and a rotational-direction gyro sensor GSR. The CPU 21, the image sensor drive unit 15, the image sensor 13 and the photographing lens 101 constitute a photographing system.

The camera body 11 is provided with various switches such as a power switch 27, a release switch 28, an astrophotography switch 29 and a setting switch 30. The CPU 21 performs controls according to the ON/OFF states of these switches 27, 28, 29 and 30. For instance, the CPU 21 turns ON/OFF the power supply from a battery (not shown) upon receipt of an operation signal from the power switch 27, and performs a focusing process, a photometering process and an image capturing process (astronomical-image capturing process) upon receipt of an operation signal from the release switch 28. The astrophotography switch 29 is for selectively setting various photography modes (exposure modes) such as a celestial-body auto tracking photography mode and a normal photography mode. The setting switch 30 is for setting, e.g., a photographic sensitivity (ISO speed) of the image sensor 13.

In the celestial-body auto tracking photography mode, the digital camera 10 operates in a manner which will be discussed hereinafter. First, a preliminary photographing operation (at step S117), for measuring the moving direction, moving speed and rotating speed of a target celestial object which is to be photographed, is performed with the position of the image sensor 13 fixed. Subsequently, based on the result of this preliminary photographing operation, a moving direction, a moving speed and a rotating speed of the image sensor 13 that are necessary to track the target celestial object are calculated. Thereafter, the CPU 21 performs an actual photographing operation while driving the image sensor 13 and controlling the movement thereof so that the image sensor 13 moves and rotates at the calculated moving speed and the calculated rotating speed in the calculated moving direction, thereby a freeze-frame picture of the target celestial object in long exposure astrophotography being obtained. The CPU 21 performs an actual photographing operation (step S123) (celestial-body auto-tracking photographing operation) with an exposure time (tracking photography exposure time) T which is arbitrary set by the user. After a lapse of the set exposure time T, the CPU 21 inputs an image signal from the image sensor 13, converts this input image signal into image data of a predetermined format to display an image of this image data on the LCD monitor 23, and writes this image data into the memory card 25.

The aforementioned preliminary photographing operation and the actual photographing operation (celestial-body auto tracking photographing operation) will be discussed in further detail hereinafter. In the preliminary photographing operation, with the image sensor 13 fixed (i.e., with a celestial-body auto tracking action suspended) after the digital camera 10 is directed toward a predetermined celestial object (s) and fixed, exposures are performed at predetermined intervals over a predetermined period of time which is sufficiently long to enable the digital camera 10 to photograph light trails (celestial trails) of celestial objects that are created due to diurnal motion, thereby obtaining celestial trails from a preliminary image thus photographed. The preliminary photographing operation is performed by the CPU 21 by temporarily intermittently opening the diaphragm 103 of the photographing lens 101 at predetermined intervals of time with a higher photographic sensitivity (ISO speed) during the preliminary photographing operation from the beginning to the end of the preliminary photographing operation. From the celestial trails thus obtained by the preliminary photographing operation and the predetermined intervals of time at which the aforementioned exposures have been performed, the moving direction, moving speed and rotating speed of an image of the target celestial object on the imaging surface of the image sensor 13 are determined as described hereinafter.

For the sake of simplicity, a celestial-body auto tracking control is deemed to be performed by moving the image sensor 13 with the center of the imaging surface 14 as a reference. Due to typical optical characteristics of the photographing optical system L, the image on the image sensor 13 becomes increasingly easily distorted away from the center of the imaging surface 14 of the image sensor 13. In general, this image distortion becomes greater as the focal length of the photographing optical system L is shorter, and the effect of the distortion on the image becomes greater as the exposure time becomes longer. Considering the maximum movement amount (maximum moving speed) of the image sensor 13 with respect to the size of the imaging surface 14 and the exposure time in the celestial-body auto-tracking photographing operation, the celestial arrangement pattern can be regarded to be substantially the same for any celestial object regardless of photographic location and time (i.e., can be regarded to be substantially invariable between the commencement and termination of celestial-body auto tracking photographing operation regardless of the position on the imaging surface 14 of the image sensor 13). Using this property, it is possible to determine celestial orbits in a easy manner.

Figure 2:
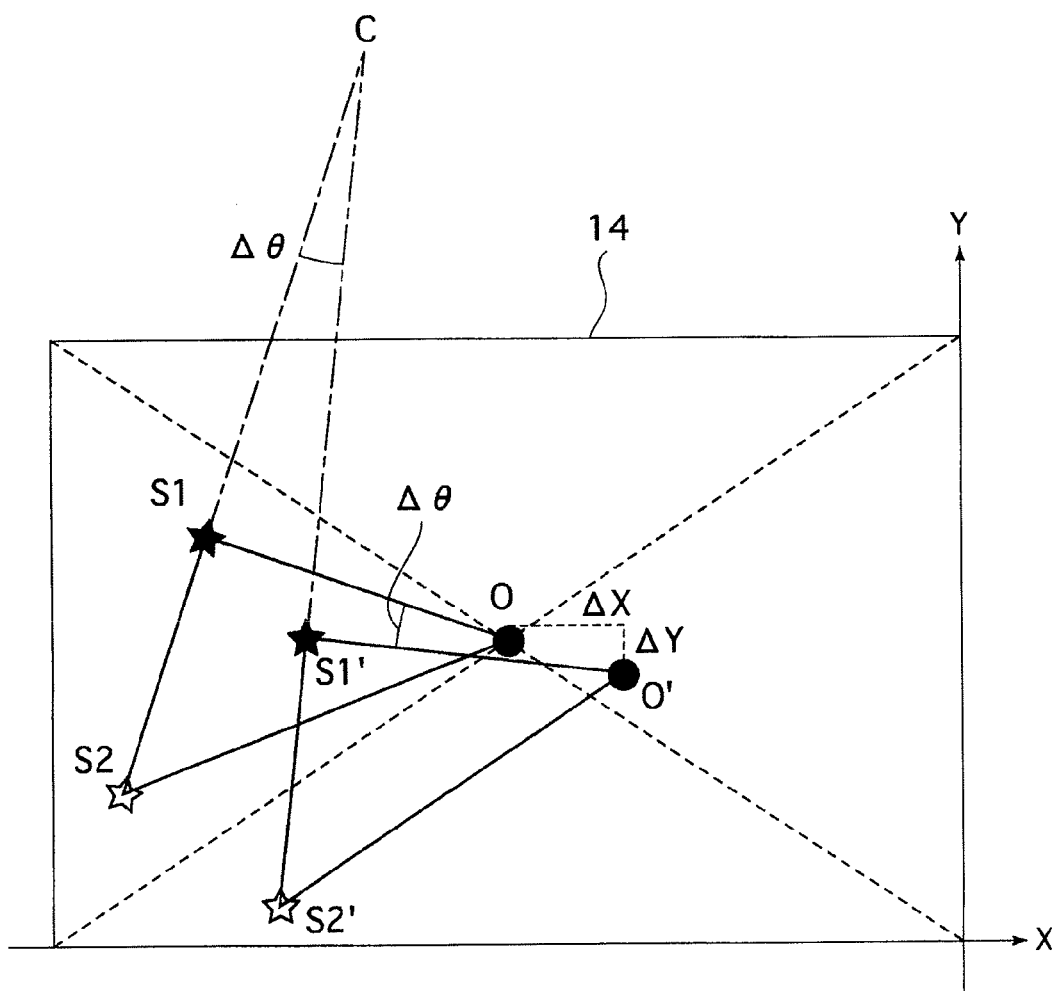
FIG. 2 is an explanatory diagram which illustrates an aspect of a preliminary photographing operation according to a method of automatically tracking and photographing celestial objects according to the present invention.
Figure 3:
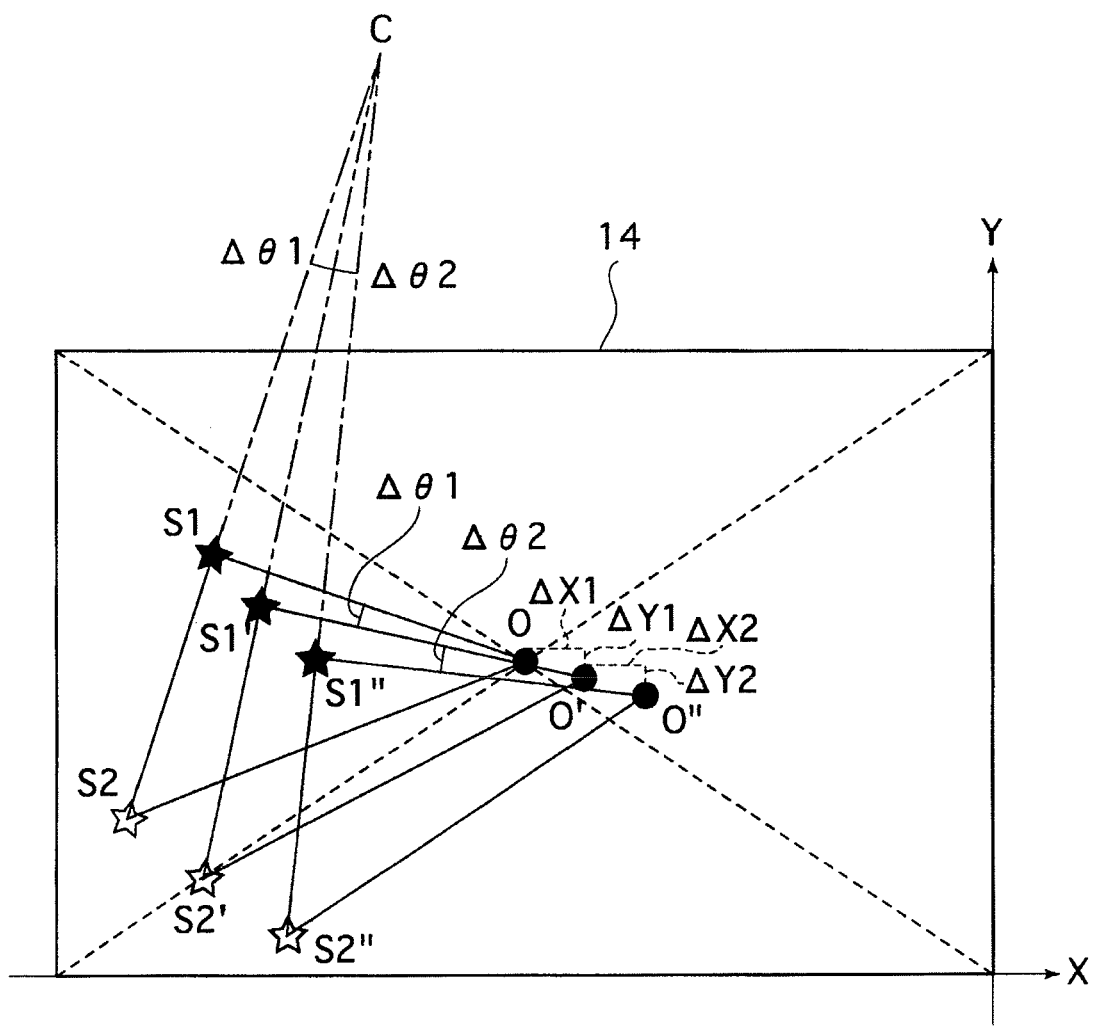
FIG. 3 is an explanatory diagram for illustrating another aspect of the preliminary photographing operation according to the method of automatically tracking and photographing celestial objects according to the present invention.
Figure 4:
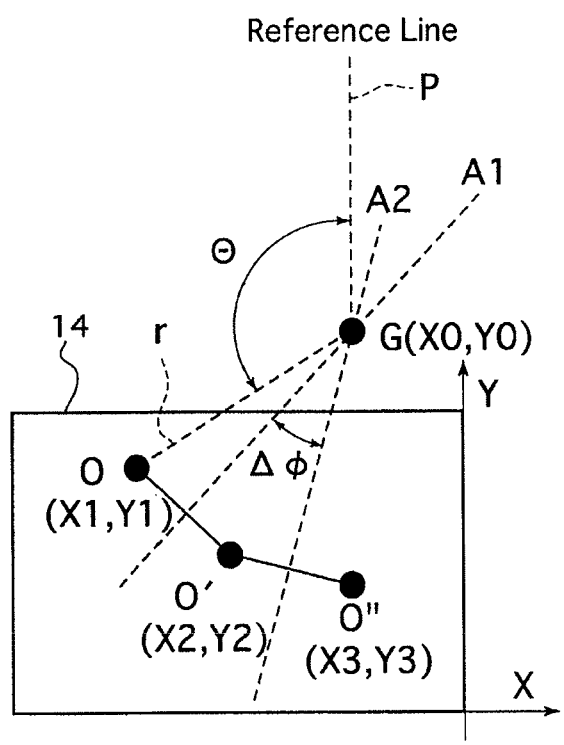
FIG. 4 is an explanatory diagram for illustrating still another aspect of the preliminary photographing operation according to the method of automatically tracking and photographing celestial objects according to the present invention.

Referring to FIGS. 2 through 4, the user operates the digital camera 10 so that two or more preliminary images photographed at an interval (exposure time interval) Δt in the preliminary photographing operation are indicated on the LCD monitor 23, and subsequently selects at least two photographed celestial objects other than those at the central portion of the imaging surface 14 (viewed on the screen of the LCD monitor 23). This selection can be carried out automatically by an image-processing operation performed by the CPU 21 that serves as an image processing circuit or by manually moving a pointer cursor indicated on the LCD monitor 23 by manually operating, e.g., a cross-key (not shown) provided on the camera body 11.

It is herein assumed that points S1 and S2 which indicate start positions of the selected two celestial objects (object images) have moved to points S1' and S2', respectively, after a lapse of the exposure time interval (a period of time (preliminary-photographing operation exposure time Tpre) from the commencement of the preliminary photographing operation until the termination thereof) Δt as shown in FIG. 2. An angle Δθ (shown in FIG. 2) between a straight line passing through the points S1 and S2 and a straight line passing through the points S1' and S2' is identical to the angle of rotation of the entire image (entire photographed celestial image). In order to simplify explanation, the center of the imaging surface 14 is regarded as point O. In the digital camera 10, the optical axis Z (Z-axis) of the photographing optical system L is set at the design stage to pass through the point O in the initial state, and the imaging surface 14 is controlled to rotate about the optical axis Z. Furthermore, it is assumed that an X-axis that is a reference axis for the X-direction, an Y-axis that is a reference axis for the Y-direction, and the Z-axis each intersect the point O in the initial state.

If a triangle congruent to a triangle ΔS1S2O connecting the points S1, S2 and O is made for the points S1' and S2' to constitute a congruent triangle ΔS1'S2'O', a movement amount ΔX from the point O to the point O' in the X-direction and a movement amount ΔY from the point O to the point O' in the Y-direction on the image plane 14 correspond to an image shifting amount on the image sensor 13.

The X-direction (X-axis) and the Y-direction (Y-axis) are defined as the long-side direction and the short-side direction of the rectangular imaging surface 14 in the design initial state, respectively. Accordingly, the image sensor 13 only needs to be rotated about an imaginary axis C, which extends parallel to the optical axis Z that is aligned with the point O, by the angle Δθ while being moved by the movement amount ΔX in the X-direction and the movement amount ΔY in the Y-direction when an actual photographing operation (celestial-body auto-tracking photographing operation) is performed in the celestial-body auto tracking photography mode.

In the celestial-body auto-tracking photographing operation that is performed after completion of the preliminary photographing operation, it is desirable that the user recompose (set) the picture in the digital camera 10 so that the placement of the points S1 and S2, which respectively indicate start positions of the two celestial objects photographed in the preliminary photographing operation, becomes as close as to the placement of those in the preliminary photographing operation. In order to do this, the image captured in the preliminary photographing operation and an image currently captured by the image sensor 13 can be superimposed on each other and displayed on the LCD monitor 23.

Although the above description with reference to FIG. 2 has been made concerning the case where the start position and the end position are photographed, in practice it is desirable to track selected celestial objects by further dividing the exposure time T into more than two to retrieve more data (start position, intermediate position(s), ..., end position), e.g., like the points S1, S1', S1'', ..., as shown in FIG. 3, and by controlling movement of the image sensor 13 sequentially so that, every time the exposure time interval Δt elapses, the image sensor 13 firstly rotates by the rotation angle Δθ1 while moving by the movement amount ΔX1 in the X-direction and the movement amount ΔY1 in the Y-direction, subsequently rotates by the rotation angle Δθ2 while moving by the movement amount ΔX2 in the X-direction and the movement amount ΔY2 in the Y-direction, and subsequently rotates while moving in the same manner.

It is of course possible to improve the precision if more celestial objects are selected, in addition to the two celestial objects represented by the two points S1 and S2, to thereby make more triangles that each includes a center point (O, O', O'', ...). This makes it possible to correct image distortion also around the periphery of the image. Specifically, when an image which the user is observing is positioned around the periphery of the imaging surface 14 of the image sensor 13 (and hence viewed at a peripheral position within the screen of the LCD monitor 23), the movement amount ΔXn, the movement amount ΔYn and the rotation angle Δθn of a celestial object which moves along image distortion around the periphery can be determined by calculation, which makes it possible to perform the celestial-body auto-tracking photographing operation without being influenced by image distortion. Note that the "n" represents a positive integer.

The above description has been discussed about an embodiment in the case where the exposure time interval Δt (the preliminary-photographing exposure time Tpre) is less than or equal to the actual-photographing exposure time T in the celestial-body auto-tracking photographing operation. However, an embodiment in which the celestial-body auto-tracking photographing operation, the exposure time of which is longer than that of the preliminary photographing operation, will be discussed hereinafter. Since it is desirable for the user that the preliminary-photographing exposure time is as short as possible, the preliminary-photographing exposure time is set shorter than the actual-photographing exposure time in this embodiment.

[Case 1]

The following two methods (1) and (2) are available as methods of determining the movement amount (moving speed) of the image sensor 13 in the subsequent celestial-body auto-tracking photographing operation in proportion to the exposure time interval Δt (the preliminary-photographing exposure time Tpre) using the movement amount ΔX, the movement amount ΔY and the rotation angle Δθ that are determined above.

(1) Calculating a movement amount ΔX, a movement amount ΔY and a rotation angle Δθ which occur during a period of time in the actual-photographing exposure time which exceeds the preliminary-photographing exposure time, in proportion to the elapsed time, by calculating the average of a large number of movement amounts ΔXn and ΔYn and a corresponding large number of rotation angles Δθn such as the movement amounts ΔX1, ΔX2, etc., that are calculated above.

(2) Calculating a movement amount ΔX in consideration of a rate of change from the latest movement amount ΔXn and the second latest movement amount ΔXn−1 according to the following equation:

$$\Delta X = \Delta Xn \times (T/\Delta t) + (\Delta Xn - [\Delta Xn-1]) \times (T/\Delta t)$$

(wherein T designates predicted tracking time, and Δt designates the time required to move the image sensor 13 in the X-direction by the movement amount ΔXn)

A movement amount ΔY and a rotation angle Δθ are also calculated in a similar manner according to the following equations:

$$\Delta Y = \Delta Yn \times (T/\Delta t) + (\Delta Yn - [\Delta Yn-1]) \times (T/\Delta t)$$

$$\Delta\theta = \Delta\theta n \times (T/\Delta t) + (\Delta\theta n - [\Delta\theta n-1]) \times (T/\Delta t)$$

[Case 2]

As described above, the image on the image sensor 13 becomes increasingly easily distorted away from the center of the imaging surface 14 of the image sensor 13 in the case where the focal length of the photographing lens 101 is short or the exposure time is long. However, considering the maximum movement amount of the image sensor 13 with respect to the size of the imaging surface 14 and the exposure time in the celestial-body auto-tracking photographing operation, celestial orbits can be made analogous to arcuate lines, not straight lines. When the points S1 and S2 have respectively moved to the points S1' and S2' after a lapse of Δt from the commencement of a preliminary photographing operation and further respectively moved to the points S1" and S2" after a lapse of a time (2×Δt) from the commencement of the preliminary photographing operation as shown in FIG. 3, a point of intersection between a perpendicular bisector of a segment O-O' of a triangle ΔS1'S2'O' congruent to the triangle ΔS1S2O and a perpendicular bisector of a segment O'-O" of a triangle ΔS1"S2"O" congruent to the triangle ΔS1S2O is represented by coordinates (X0, Y0) (see FIG. 4). Namely, as shown in FIG. 4, at least three center points obtained from the aforementioned method (1) or (2) are arranged as center points O, O', O", . . . in order of time sequence, and coordinates of the center points O, O', O", . . . are denoted by (X1, Y1), (X2, Y2), (X3, Y3), . . . , respectively.

The perpendicular bisector of the segment O-O' is defined as a straight line A1.

Likewise, the perpendicular bisector of the segment O'-O" is defined as a straight line A2.

The x-y coordinates of the point of intersection between the straight lines A1 and A2 is denoted by G(X0, Y0). This coordinate system is an X-Y coordinate system with the center of the imaging surface 14 which is located at the initial position thereof corresponding to the point of origin of the coordinate system, wherein the long-side direction (lateral axis) and the short-side direction (vertical axis) of the coordinate system represent the X-direction (X-axis) and the Y-direction (Y-axis), respectively.

If the angle between the straight lines A1 and A2 is represented by Δϕ, the center of the imaging surface 14 is considered to move 2Δϕ along a circle about the point G(X0, Y0) in the range from the point O until the point O". Namely, the point G(X0, Y0) is an assumed rotational center of the points O, O' and O". Since the turning angle velocity is Δϕ/Δt, the following equation is satisfied:

$$r = \{(X1-X0)^2 + (Y1-Y0)^2\}^{1/2}$$

wherein r represents the radius of rotation.

If the angle between a line normal to the X-axis (reference line P which passes through the intersection point G and is parallel to the Y-axis) and a straight line G-O is represented by Θ, the coordinates (Xt, Yt) of the predicted center points O', O", . . . of the imaging surface 14 after a lapse of the exposure time T from the point O, which represents the initial center (point of origin) of the imaging surface 14, can be expressed by the following equations:

$$Xt = X0 - r \times \sin(\Theta + \Delta\phi/\Delta t \times T)$$

$$Yt = Y0 + r \times \cos(\Theta + \Delta\phi/\Delta t \times T)$$

In this manner, the coordinates (Xt, Yt) of the predicted center points O', O", . . . of the imaging surface 14 after a lapse of the exposure time T from the point O are determined. However, the rotation angle Δθ of the imaging surface 14 (the image sensor 13) which is obtained in the aforementioned CASE 1 is used as the rotation angle Δθ of this case (CASE 2). It is of course possible to improve the precision by determining the rotation angle and the movement amount by increasing the number of center points of the imaging surface 14, e.g., predicted center points O', O", O"', O"", . . . . The coordinates G(X0, Y0) after a lapse of the exposure time T from the point O is invariant regardless of the magnitude of the exposure time T. Therefore, the center points O, O', O", . . . of the imaging surface 14 when the image sensor 13 is driven linearly or rotated about an axis parallel to the optical axis Z always lie on an imaginary circle having a radius r about the coordinates G(X0, Y0).

Additionally, in the case where no intersection point exists between the straight lines A1 and A2, celestial orbits become parallel to an extension line of the straight line O-O', and accordingly, the celestial-body auto-tracking photographing operation is performed by moving the center of the imaging surface 14 on a straight line parallel to the straight line O-O'. Namely, in such a case, no rotational motion about an axis parallel to the optical axis Z needs to applied to the image sensor 13.

Figure 5:
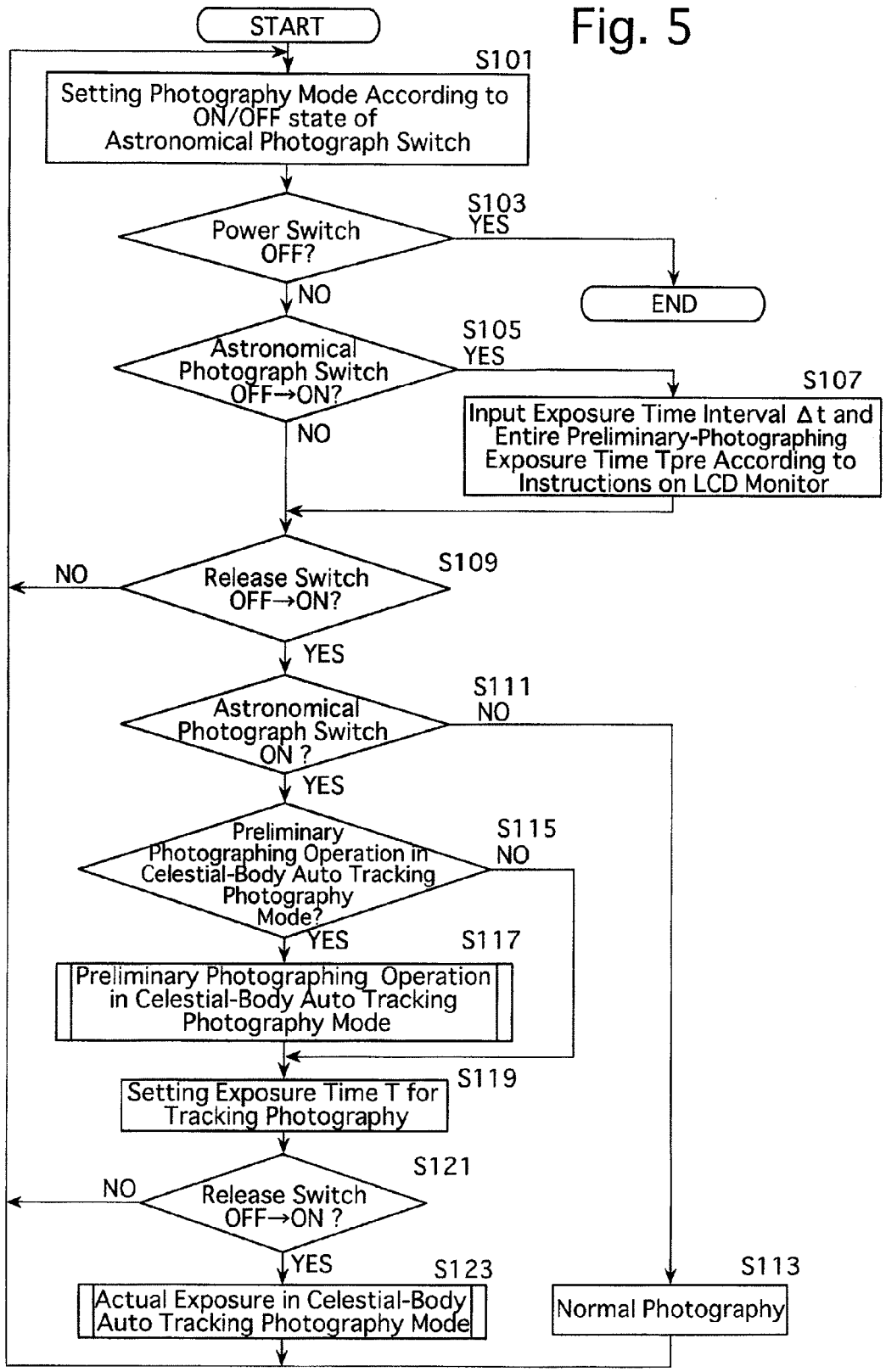
FIG. 5 is a flowchart showing a main process performed when a picture is taken by the digital camera in either a normal photography mode or an astrophotography mode (celestial-body auto tracking photography mode)
Figure 6:
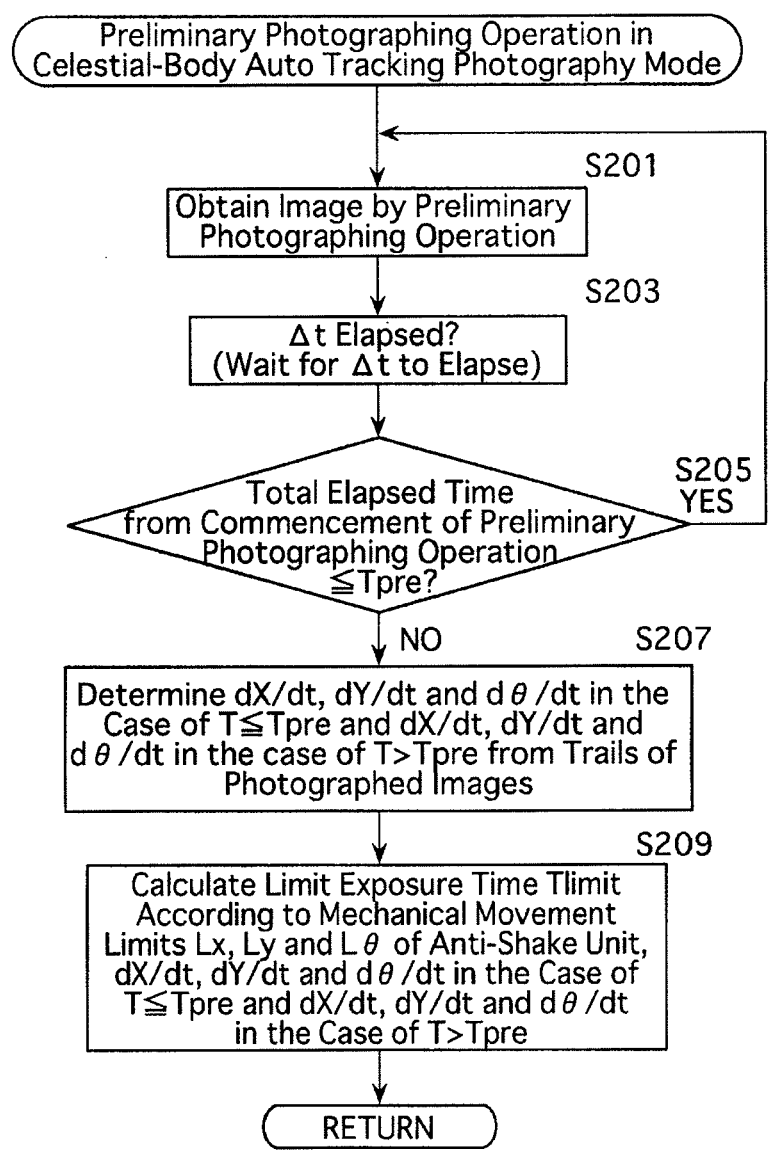
FIG. 6 is a flow chart showing a series of operations performed in the preliminary photographing operation (step S117) shown in FIG. 5.
Figure 7:
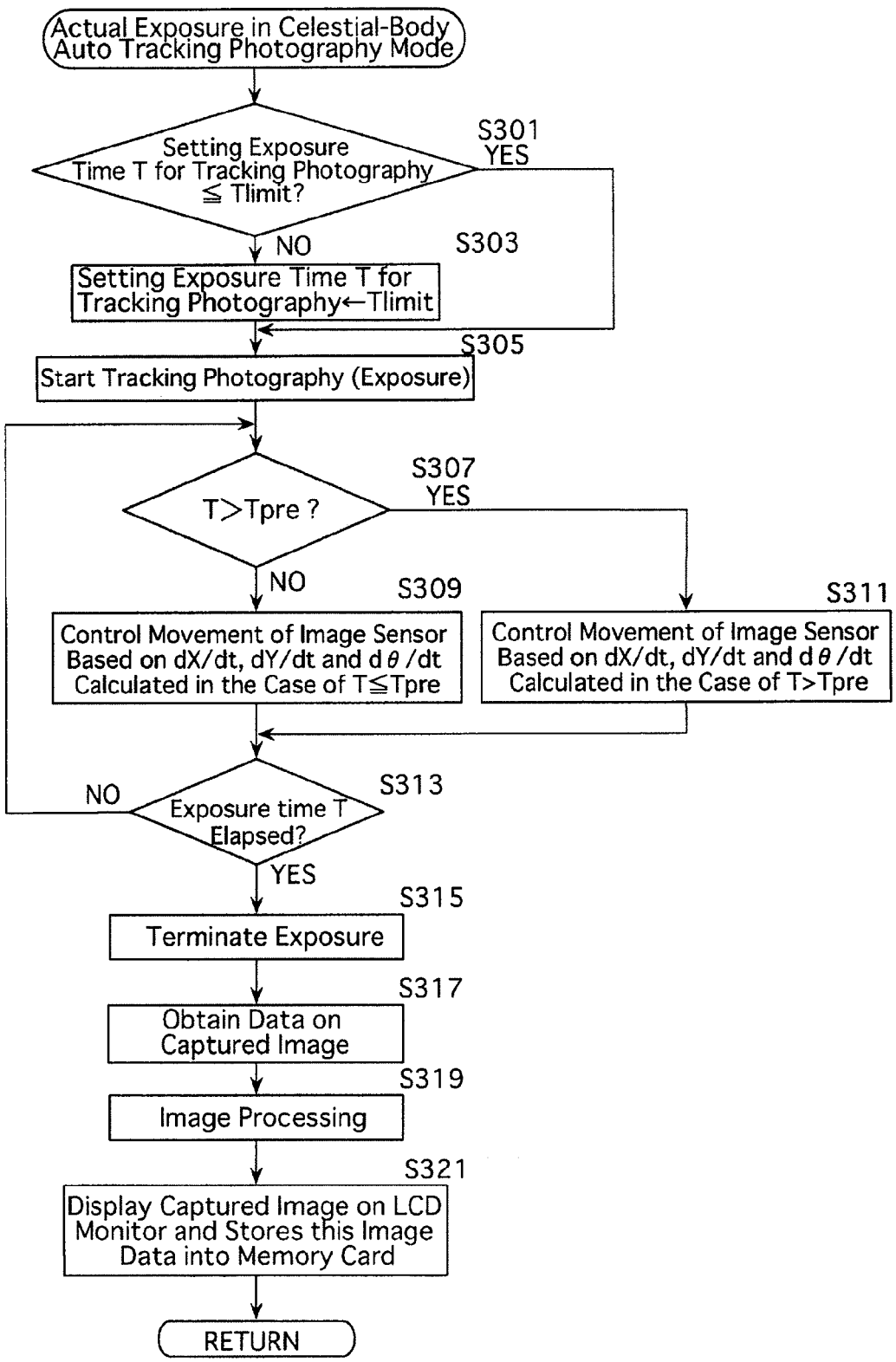
FIG. 7 is a flow chart showing a series of operations performed in the actual photographing operation (step S123) shown in FIG. 5.

Astrophotography (celestial-body auto tracking photography) with the digital camera 10 will be hereinafter discussed with reference to the flow charts shown in FIGS. 5 through 7. As shown in FIG. 5, upon the release switch 28 being turned ON with the power switch 27 ON, a normal exposure operation is performed if the digital camera 10 is in a normal photography mode (not the celestial-body auto tracking photography mode) that is set by turning OFF the astrophotography switch 29 (step S101, NO at step S103, NO at step S105, YES at step S109, NO at step S111, and step S113). Control ends upon the power switch 27 being turned OFF (YES at step S103, END). No photographing operation is performed unless the release switch 28 is turned ON (NO at step S103).

On the other hand, if the power switch 27 is in the ON state (if NO at step S103) and if the astrophotography switch 29 is turned ON to put the digital camera 10 into the celestial-body auto tracking photography mode (if YES at step S105), an exposure time interval Δt and an entire preliminary-photographing exposure time (preliminary-photographing exposure time) Tpre are input (step S107). This exposure time interval Δt and this entire preliminary-photographing exposure time Tpre are manually selected or input by the user with reference to default values according to instructions indicated on the LCD monitor 23. The celestial-body auto-tracking photographing operation is performed upon the release switch 28 being turned ON with the points S1 and S2, which respectively indicate start positions of at least two celestial objects (two celestial objects in this particular embodiment), captured at positions on the image sensor 13 which are different from the center position of the imaging surface 14 in a state where the digital camera 10 remains set in the celestial-body auto tracking photography mode by the astrophotography switch 29 (YES at step S109, and YES at step S111).

In the celestial-body auto-tracking photographing operation, first the CPU 21 performs the above described preliminary photographing operation to obtain preliminary images, and calculates from these preliminary images the movement amount ΔX, the movement amount ΔY and the rotation angle Δθ, which represent the moving direction (rotational direction) and the movement amount (rotation amount) of the image sensor 13 that are necessary to track the target celestial object (YES at step S115 and step S117). Subsequently, the tracking photography exposure time T, which is arbitrary set by the user, is set in the digital camera 10 (step S119). The movement amount ΔX, the movement amount ΔY and the rotation angle Δθ which are divided by the tracking photography exposure time T equals the moving speed (rotating speed) of the image sensor 13. After completion of the preliminary photographing operation (step S117), the obtained preliminary images or a synthesized image thereof can be indicated on the LCD monitor 23 to be visually confirmed by the user. In addition, in the case of digital cameras which are equipped with an AF system and to which an AF compatible lens is attached, the focal point is fixed at infinity, or a focus operation for focusing the camera at infinity is performed before the astronomical-image capturing process is performed upon the celestial-body auto tracking photography mode being set by the astrophotography switch 29. In the case of manual focus, the user manually sets the focus at infinity.

After the movement amount ΔX, the movement amount ΔY and the rotation angle Δθ, which represent the moving direction (rotational direction) and the movement amount (rotation amount) of the image sensor 13, are calculated after completion of the preliminary photographing operation, the user recomposes the picture in the digital camera 10 so that the placement of the points S1 and S2, which respectively indicate start positions of the two celestial objects photographed in the preliminary photographing operation, becomes as close as possible to the placement of those in the preliminary photographing operation, and thereafter the release switch 28 is turned ON again (YES at step S121). Upon release switch 28 being turned ON, an actual photographing operation (celestial-body auto-tracking photographing operation) according to the present invention that uses the results of the preliminary photographing operation (step S117) is performed (step S123).

[Preliminary Photographing Operation]

The preliminary photographing operation (step S117) that is performed in the present embodiment of the digital camera 10 will be hereinafter discussed with reference to the flow chart shown in FIG. 6.

Immediately after control enters the preliminary photographing operation, firstly the CPU 21 performs a process for carrying out an exposure operation to obtain an object image (step S201). More specifically, in the present embodiment, exposures (multiple exposure) are performed at intervals each corresponding to the aforementioned exposure time interval Δt until the aforementioned entire preliminary-photographing exposure time Tpre elapses to obtain a single or a plurality of images (steps S201 and S203, and YES at step S205). One or more images thus obtained are stored in the memory card 25 as image data. When the number of images thus obtained is more than one, the CPU 21 synthesizes these images into a single image and stores this image data into the memory card 25.

After a lapse of the entire preliminary-photographing exposure time Tpre (NO at step S205), the CPU 21 determines dX/dt, dY/dt and dθ/dt, which represent the moving direction (rotational direction) and the movement amount (rotation amount) of the image sensor 13 per unit of time, by calculating, from the trails of the images obtained by the aforementioned exposure (multiple exposure) (i.e., by the operations at steps 201 through S205), the movement amount ΔX, the movement amount ΔY and the rotation angle Δθ, which represent the moving direction (rotational direction) and the movement amount (rotation amount) of the image sensor 13, and dividing the movement amount ΔX, the movement amount ΔY and the rotation angle Δθ by the tracking photography exposure time T (step S207). At this stage, the CPU 21 determines two sets of dX/dt, dY/dt and dθ/dt values for two different cases, respectively: case 1) for when the tracking photography exposure time T is within the entire preliminary-photographing exposure time Tpre (i.e., T≥Tpre), and case 2) for when the tracking photography exposure time T exceeds the entire preliminary-photographing exposure time Tpre (i.e., T>Tpre).

Lastly, the CPU 21 calculates a longest exposure time (exposure time limit) Tlimit according to mechanical movement limits Lx, Ly and Lθ in the range of movement of the image sensor 13 that is moved by the image sensor drive unit 15, the aforementioned former set of dX/dt, dY/dt and dθ/dt values for the case where the tracking photography exposure time T is within the entire preliminary-photographing exposure time Tpre, and the aforementioned latter set of dX/dt, dY/dt and dθ/dt values for the case where the tracking photography exposure time T exceeds the entire preliminary-photographing exposure time Tpre (step S209). Thereafter control returns.

[Actual Photographing Operation in Celestial-Body Auto Tracking Photography Mode (Celestial-Body Auto-Tracking Photographing Operation)]

The actual photographing operation performed in the celestial-body auto tracking photography mode (step S123) in the present embodiment will be hereinafter discussed in detail with reference to the flow chart shown in FIG. 7.

In the actual photographing operation, firstly the CPU 21 determines whether or not the tracking photography exposure time T, which is set by the user at step S119, is within (less than or equal to) the longest exposure time Tlimit that is calculated at step S209 (step S301). If the tracking photography exposure time T is determined at step S301 as being within the longest exposure time Tlimit (if YES at step S301), the CPU 21 sets the tracking photography exposure time T as an exposure time for the actual photographing operation. On the other hand, if the tracking photography exposure time T is determined at step S301 as exceeding the longest exposure time Tlimit (if NO at step S301), the CPU 21 sets the longest exposure time Tlimit as an exposure time for the actual photographing operation (step S303). Subsequently, the CPU 21 controls the operation of a shutter (not shown) so that the shutter opens for the set exposure time to start capturing an image via the image sensor 13 (step S305). Although an image is normally captured with the diaphragm 103 fully open, the aperture size of the diaphragm 103 can be freely set by the user.

If the tracking photography exposure time T is within (less than or equal to) the entire preliminary-photographing exposure time Tpre, the CPU 21 performs, during the tracking photography exposure time T, an exposure operation while controlling the linear movement and the rotational movement of the image sensor 13 in accordance with the trails of images obtained based on the values dX/dt, dY/dt and dθ/dt calculated in the case where the tracking photography exposure time T is within (less than or equal to) the entire preliminary-photographing exposure time Tpre (NO at step S307, step S309, and NO at step S313).

On the other hand, when the tracking photography exposure time T exceeds the entire preliminary-photographing exposure time Tpre, the CPU 21 firstly performs, during the tracking photography exposure time T, an exposure operation while controlling the linear and rotational movements of the image sensor 13 in accordance with the trails of images obtained based on the values dX/dt, dY/dt and dθ/dt calculated in the case where the tracking photography exposure time T is within the entire preliminary-photographing exposure time Tpre, and subsequently, during a period of time in the tracking photography exposure time T which exceeds the entire preliminary-photographing exposure time Tpre, the CPU 21 continues to perform the exposure operation while controlling the linear and rotational movements of the image sensor 13 in accordance with the trails of images obtained based on the values dX/dt, dY/dt and dθ/dt calculated in the case where the tracking photography exposure time T exceeds the entire preliminary-photographing exposure time Tpre (No at step S307, step S309 and NO at step S313→YES at step S307, step S311 and NO at step S313).

Subsequently, after a lapse of the tracking photography exposure time T (YES at step S313), the CPU 21 closes the shutter (not shown) to terminate the exposure operation (step S315). Thereafter, the CPU 21 reads out image data on the captured image from the image sensor 13 (step S317) and performs image processing operations such as a white balance adjustment operation and an image processing operation for converting the format type into a predetermined type of format (step S319). Lastly, the CPU 21 causes the image data on the captured image, on which the aforementioned image processing operations have been performed, to be displayed on the LCD monitor 23, stores this image data into the memory card 25 as an image file of a predetermined format (step S321), and control returns.

If the digital camera 10 is of a type equipped with a mechanical shutter, the exposure commencement at step S305 and the exposure termination at step S315 include a mechanical shutter opening process and a mechanical shutter closing process, respectively. If the digital camera 10 is of a type equipped with an electronic shutter, the exposure commencement at step S305 and the exposure termination at step S315 include a process of commencing the exposure upon sweeping out electric charges accumulated in the image sensor 13 and a process of terminating the exposure upon transferring or reading out the same electric charges, respectively.

As described above, according to the above described method of automatically tracking and photographing celestial objects according the present invention and the above described embodiment of the digital camera employing this method, before the celestial-body auto-tracking photographing operation is performed, the photographic apparatus is directed toward a predetermined celestial object, and the above described preliminary photographing operation, which is for obtaining preliminary images by performing exposures over a predetermined period of time, is performed with the celestial-body auto tracking action suspended. Thereafter, the moving direction and the moving speed of the celestial object image are calculated from the images obtained by the preliminary photographing operation, and the celestial-body auto-tracking photographing operation is performed while moving a predetermined imaging area of the imaging surface 14 of the image sensor (image pickup device) 13o based on the calculated moving speed and rotating speed of the celestial object image. This enables the capturing of a still image of a celestial object(s) in a state where each celestial object appears stationary with respect to a predetermined imaging area of the imaging surface 14 of the image sensor 13 (i.e., with respect to a fixed point on the (rotating) Earth) in long exposure astrophotography with a camera directed toward a arbitrary-selected celestial object and fixed with respect to the ground and without using an equatorial (which is generally expensive and requires complicated adjustments).

Another embodiment of the method of automatically tracking and photographing celestial objects according to the present invention and another embodiment of the digital camera employing this method will be discussed hereinafter with reference to FIGS. 8 through 10.

When a long exposure astrophotography such as shown in FIGS. 2 and 3 is carried out, it becomes easy to transform positions of celestial objects into x and y coordinates as points by performing a short-time multiple exposure in the preliminary photographing operation. Nevertheless, it becomes difficult to discriminate which points represent the positions of the same celestial object before and after movement thereof.

Figure 8:
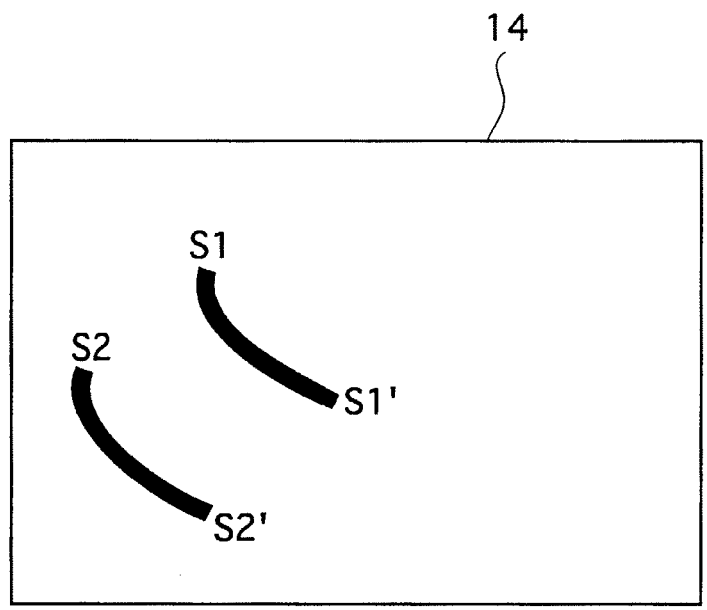
FIG. 8 is an explanatory diagram for illustrating a case in which three or more intermediate points are extracted from a trail image of a celestial object in the preliminary photographing operation.
Figure 9:
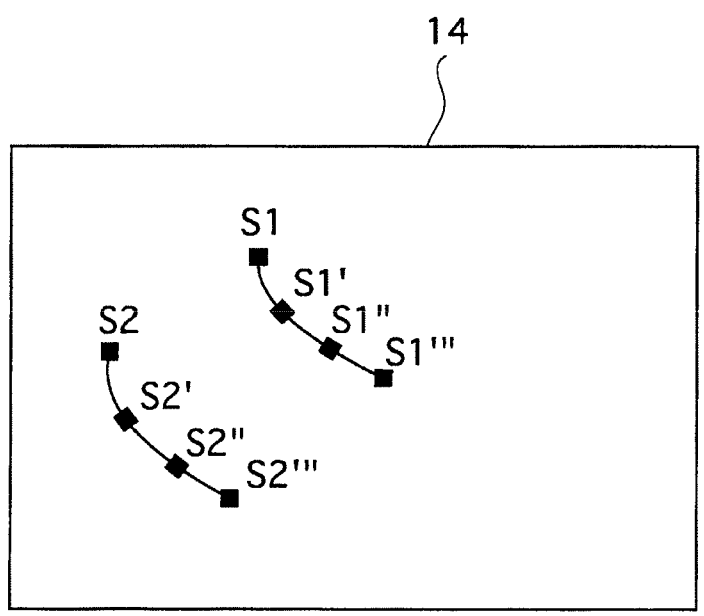
FIG. 9 is an explanatory diagram for illustrating an aspect of another embodiment of the preliminary photographing operation according to the method of automatically tracking and photographing celestial objects according to the present invention.

If one desires to perform a coordinate transformation on the two points of each celestial object image before and after movement thereof as shown in FIG. 2, the CPU 21 only needs to perform a long time exposure in the preliminary photographing operation and determine the two end positions (S1 and S2, or S1' and S2') of the line trail of each celestial object as shown in FIG. 8 as a start position and an end position, respectively. However, in the case where more than two points are extracted from a trail image of the same celestial object as shown in FIG. 4, it is sometimes the case that one or more intermediate points between the start position and the end position exist off a straight line connecting the start position and the end position. Accordingly, in the case of extracting more than two points from a trail image of the same celestial object, the amount of exposure is caused to change (increase) at each point of elapsed time when a point is desired to be extracted while a trail image of the same celestial object is photographed as a line image in a long time exposure. More specifically, the amount of exposure is caused to change (increase/decrease) by opening/stopping-down the aperture size of the diaphragm 103 via control by the CPU 21.

During the preliminary photographing operation, the diaphragm 103 is driven toward full aperture so that an exposure is made with the diaphragm 103 fixed at a large aperture for a set period of time (exposure time interval) $\Delta s$ when it is desired to leave the positions of celestial object images as points in coordinate system, and the diaphragm 103 is driven to stop down appropriately so that an exposure is made at a small aperture on the stopped-down side during a (remaining) exposure time $\Delta u$ other than the set period of time $\Delta s$. Thereupon, the celestial objects are photographed as relatively large images during each exposure time ($\Delta s$) that the diaphragm 103 is driven toward the full aperture side, so that it is possible to obtain an image at the points S1, S1', S1" . . . (photographed as dots in FIG. 3) of a selected celestial object are connected with line trails (line segments) of the same celestial object and the points S2, S2', S2" . . . (photographed as dots in FIG. 3) of another selected celestial object are connected with line trails (line segments) of the same celestial object as shown in FIG. 9. In addition, from each of these celestial trails, four points (S1, S1', S1" and S1''', or S2, S2', S2" and S2''') can be extracted. The following conditional expression is satisfied:

$$\Delta s < \Delta u,$$

wherein $\Delta s$ represents a first period of time (exposure time on the full aperture side), and $\Delta u$ represents a second period of time (exposure time on the stop-down side) between first and second exposures of first set periods of time Δs and Δs.

A method of discriminating between the start position and the end position of each line trail can be such as to determine the opening time of the diaphragm 103, e.g., to vary (e.g., double) the opening time of the diaphragm 103 at either the start position or the end position.

[Preliminary Photographing Operation (Using Long Time Exposure and Diaphragm Control in Combination)]

Another embodiment of the preliminary photographing operation that uses long time exposure and diaphragm control in combination will be hereinafter discussed with reference to the flow chart shown in FIG. 10.

In this embodiment of the preliminary photographing operation, a predetermined process (in which the diaphragm 103 is opened to make a first exposure for a first set period of time Δs, the diaphragm 103 is stopped down for a second set period of time Δu upon completion of the first exposure, and the diaphragm 103 is again opened to make a second exposure for the first set period of time Δs) is repeated within the entire preliminary-photographing exposure time Tpre so as to further open the diaphragm 103 (so as to widen the aperture thereof) to increase the amount of exposure once at the commencement of the preliminary photographing operation, once at the termination of the preliminary photographing operation, and at least once during the preliminary photographing operation. In this embodiment of the preliminary photographing operation, for the sake of simplifying the description, it is deemed that the diaphragm 103 is fully opened when opened toward the full aperture side and that the diaphragm 103 is stopped down three steps (−3 EV) according to the Apex system from the full aperture state when stopped down.

The digital camera 10, to which this embodiment of the preliminary photographing operation is applied, is provided with Timer 1 and Timer 2 (both not shown). Timer 1 measures the period of time from the commencement of the preliminary photographing operation until a lapse of the entire preliminary-photographing exposure time Tpre, and Timer 2 alternately measures the first set period of time Δs and the second set period of time Δu while being reset repeatedly every time the opening operation and the stop-down operation of the diaphragm 103 are switched.

Figure 10:
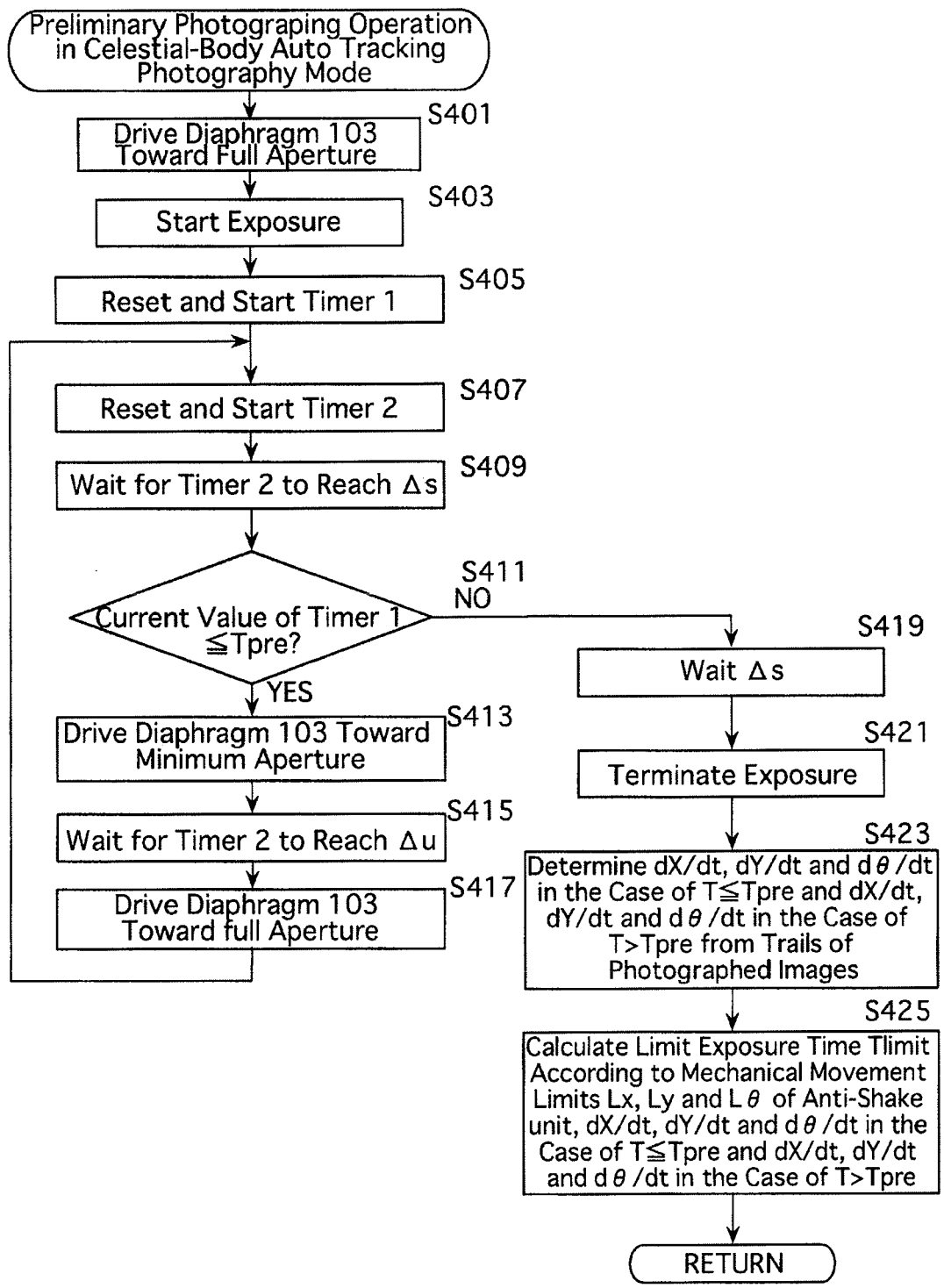
FIG. 10 is a flow chart showing a series of operations performed in the embodiment of FIG. 9 of the preliminary photographing operation.

In the preliminary photographing operation shown in FIG. 10, firstly the CPU 21 drives the diaphragm 103 toward the full aperture side to start a first exposure (steps S401 and S403). Thereupon, the CPU 21 resets and starts Timer 1 to thereby commence measuring the period of time from the commencement of the preliminary photographing operation until a lapse of the entire preliminary-photographing exposure time Tpre (step S405), and subsequently, the CPU 21 resets and starts Timer 2 to thereby commence measuring the period of time from the moment the diaphragm 103 is opened until a lapse of the first set period of time Δs (step S407).

Upon the completion of the first exposure following the lapse of the first set period of time Δs (S409), the CPU 21 stops down the diaphragm 103 and resets and starts Timer 2 to thereby commence measuring the period of time from the moment the diaphragm 103 is stopped down until a lapse of the first set period of time Δu (step S413). After a lapse of the second set period of time Δu (step S415), the CPU 21 drives the diaphragm 103 to again open the diaphragm 103 to perform a second exposure for the first set period of time Δs (step S417). The CPU 21 repeats the above described operations at steps S407 through S417 until the expiration of the entire preliminary-photographing exposure time Tpre (YES at step S411).

Thereafter, upon the expiration of the entire preliminary-photographing exposure time Tpre (NO at step S411), the CPU 21 refers to Timer 2 and performs a final exposure with the diaphragm 103 being kept open for another the first set period of time Δs (step S419). Upon performing this final exposure, the exposure time of the ending part of the preliminary photographing operation becomes equal to double the first set period of time Δs, and accordingly, the celestial object image formed in the vicinity of the end position of each line trail obtained in the preliminary photographing operation is photographed as a brighter and larger image, which makes it possible to identify the coordinates of the celestial object image more clearly. This double-time exposure can also be performed at the commencement of the preliminary photographing operation.

Upon completion of the final exposure (step S421), the CPU 21 determines dX/dt, dY/dt and dθ/dt, which represent the moving direction (rotational direction) and the movement amount (rotation amount) of the image sensor 13 per unit of time, by calculating, from the trails of the images obtained by the operations at steps 201 through S205, the movement amount ΔX, the movement amount ΔY and the rotation angle Δθ, which represent the moving direction (rotational direction) and the movement amount (rotation amount) of the image sensor 13, and dividing the movement amount ΔX, the movement amount ΔY and the rotation angle Δθ by the tracking photography exposure time T (step S423). At this stage, the CPU 21 determines two sets of dX/dt, dY/dt and dθ/dt values for two separate cases, respectively: case 1) for when the tracking photography exposure time T is within (less than or equal to) the entire preliminary-photographing exposure time Tpre, and case 2) for when the tracking photography exposure time T exceeds the entire preliminary-photographing exposure time Tpre.

Lastly, the CPU 21 calculates a longest exposure time (exposure time limit) Tlimit according to mechanical movement limits Lx, Ly and Lθ in the range of movement of the image sensor 13 that is moved by the image sensor drive unit 15, the aforementioned former set of dX/dt, dY/dt and dθ/dt values for the case where the tracking photography exposure time T is within (less than or equal to) the entire preliminary-photographing exposure time Tpre and the aforementioned latter set of dX/dt, dY/dt and dθ/dt values for the case where the tracking photography exposure time T exceeds the entire preliminary-photographing exposure time Tpre (step S425). Thereafter control returns.

The aforementioned movement limits Lx and Ly, and the aforementioned limit Lθ define the range of movement of a movable member in directions orthogonal to the optical axis Z, which is driven to move the image sensor 13 of the image sensor drive unit 15 to counteract image shake, and the range of rotation angle of the same movable member about an axis parallel to the optical axis Z, respectively.

According to the above described preliminary photographing operation, one or more selected celestial objects such as the two celestial objects respectively indicated by the points S1, S1', S1" . . . and the points S2, S2', S2" . . . are each photographed as a dense and large dot image at each of the preliminary photographing commencement position, the preliminary photographing termination position and an intermediate time interval positions therebetween, and the dense and large dot images of each celestial object are connected with line trails of the same celestial object. Accordingly, the dense and large dot images of the points (S1, S1', S1" . . . , or S2, S2', S2" . . . ) of each selected celestial object can be precisely identified as those of the same celestial object, and the positions of the points (S1, S1', S1"..., or S2, S2', S2"...) of each selected celestial object can be precisely determined at each exposure time interval.

Although the digital camera 10 is equipped with the image sensor drive unit 15 that moves the image sensor 13 in directions orthogonal to the optical axis Z and rotates about an axis parallel to the optical axis Z, the digital camera according to the present invention can be alternatively configured as a combination of an image shake corrector (anti-shake apparatus) provided in the photographing lens 101 with an image shake correcting lens for moving object images on the image sensor 13 and an image sensor rotating mechanism for rotating the image sensor 13. Accordingly, a celestial object(s) can be automatically tracked and photographed while moving at least one of a predetermined imaging area of the imaging surface 14 of the image sensor (image pickup device) 13 and the image forming position of a celestial object image based on the calculated moving speed and rotating speed of the celestial object image. This is achieved by the above-mentioned image shake corrector (anti-shake apparatus) provided in the photographing lens 101 linearly moving image forming position of the celestial object image(s) that is imaged onto the imaging surface 14 of the image sensor 13 while the image sensor drive unit 15 rotates the image sensor 13 about an axis parallel to the optical axis Z.

In addition, a digital camera has been described above as a camera according to the present invention; however, the present invention is applicable to not only lens-interchangeable SLR digital cameras and lens shutter type compact digital cameras, but also general photographic apparatus in which an image sensor (image pickup device) can be driven to move in any given direction orthogonal to a photographing optical axis and rotate in a plane orthogonal to the photographing optical axis.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A method of automatically tracking and photographing a celestial object which moves relative to a photographic apparatus due to diurnal motion so that a celestial object image, which is formed on an imaging surface of an image sensor via a photographing optical system, becomes stationary relative to a predetermined imaging area of the imaging surface of the image sensor during a tracking and photographing operation, the method comprising:
   performing a preliminary photographing operation for a predetermined preliminary-photographing exposure time with said photographic apparatus directed toward said celestial object and with a celestial-body auto tracking action suspended to obtain a preliminary image before automatically tracking and photographing said celestial object;
   calculating a moving direction and a moving speed of the celestial object image from said preliminary image that is obtained by said preliminary photographing operation; and
   automatically tracking and photographing said celestial object based on the calculated moving direction and the calculated moving speed of the celestial object image.

2. The method according to claim 1, wherein said automatically tracking and photographing comprises automatically tracking and photographing while moving at least one of said predetermined imaging area of said imaging surface of the image sensor and an image-forming position of the celestial object image relative to said photographic apparatus based on the calculated moving direction and the calculated moving speed of the celestial object image.

3. The method according to claim 1, wherein said calculating of said moving direction and said moving speed of the celestial object image from said preliminary image comprises calculating from positions of first images of at least two celestial objects which are formed on said imaging surface at a commencement of said preliminary photographing operation and positions of second images of said at least two celestial objects which are formed on said imaging surface after a lapse of a predetermined period of time from said commencement of said preliminary photographing operation.

4. The method according to claim 3, wherein points S1 and S2 designate said positions of said first images of said two celestial objects, points S1' and S2' designate said positions of said second images of said two celestial objects, point O designates an arbitrary point on said preliminary image at said commencement of said preliminary photographing operation that is different from said points S1 and S2, and $\Delta t$ designates a period of time from said commencement of said preliminary photographing operation until a termination of the preliminary photographing operation, said calculating of said moving direction and said moving speed of the celestial object image from said preliminary image comprising:
   calculating an angle $\Delta\theta$ between a straight line passing through points S1 and S2 and a straight line passing through points S1' and S2', wherein said angle $\Delta\theta$ defines an angle of rotation of the celestial object image; and
   calculating a distance between said point O and a point O' of three points forming a triangle $\Delta$S1'S2'O' that is congruent to a triangle $\Delta$S1S2O defined by said points S1, S2 and O as an image shifting amount of the celestial object image.

5. The method according to claim 4, further comprising:
   calculating and determining a movement amount and an angle of rotation of the celestial object image which occur during an actual-photographing exposure time, which exceeds said preliminary-photographing exposure time, by calculating an average of movement amounts and rotation angles of said two celestial object images that are obtained by performing said preliminary photographing operation a plurality of times.

6. The method according to claim 4, further comprising:
   calculating and determining a movement amount and an angle of rotation of the celestial object image which occur during an actual-photographing exposure time, which exceeds said preliminary-photographing exposure time, from a rate of change in movement amounts and rotation angles of said two celestial object images that are obtained by performing said preliminary photographing operation a plurality of times.

7. The method according to claim 3, wherein, in an X-Y coordinate system in which horizontal and vertical axes of said imaging surface having a rectangular shape represent an X-axis and a Y-axis, respectively, points S1 and S2 designate said positions of said first images, points S1' and S2' designate said positions of said second images after a lapse of a time $\Delta t$ from a commencement of a preliminary photographing operation, points S1" and S2" designate positions of third images of said at least two celestial objects which are formed on said imaging surface after a lapse of a time ($2\times\Delta t$) from a commencement of the preliminary photographing operation, and point O designates an arbitrary point on said preliminary image at said commencement of said preliminary photographing operation that is different from said points S1 and S2, said calculating of said moving direction and said moving speed of the celestial object image from said preliminary image further comprises determining coordinates Xt and Yt of predicted center points O' and O", . . . of said imaging surface after a lapse of an exposure time T from said point O from the following equations:

$$Xt = X0 - r \times \sin(\Theta + \Delta\phi/\Delta t \times T)$$

$$Yt = Y0 + r \times \cos(\Theta + \Delta\phi/\Delta t \times T)$$

wherein X0 and Y0 designate x and y coordinates of a point of intersection G between a perpendicular bisector of a segment O-O' and a perpendicular bisector of a segment O'-O", and Θ designates an angle between a straight line which passes through said intersection point G and is parallel to said Y-axis and a straight line G-O which connects said point O and said intersection point G.

8. The method according to claim 1, wherein said performing of said preliminary photographing operation comprises one of performing a plurality of exposures at predetermined intervals, and photographing at least two images and synthesizing said two images into a single image.

9. The method according to claim 1, wherein said performing of said preliminary photographing operation comprises:
one of temporarily opening an aperture of an adjustable diaphragm of a photographing lens, in which said photographing optical system is provided, and temporarily increasing a photographic sensitivity to increase an amount of exposure at each of a commencement of said preliminary photographing operation and a termination of the preliminary photographing operation, during said preliminary photographing operation.

10. The method according to claim 1, wherein said performing of said preliminary photographing operation comprises:
one of temporarily repeatedly opening an aperture of an adjustable diaphragm of a photographing lens, in which said photographing optical system is provided, and temporarily repeatedly increasing a photographic sensitivity to increase an amount of exposure repeatedly at predetermined intervals.

11. A camera employing the method according to claim 1, comprising:
a photographing system which performs said preliminary photographing operation and automatically tracks and photographs said celestial object; and
a controller which performs said calculating of the moving direction and the moving speed.

12. The camera according to claim 11, wherein said photographing system comprises said photographing optical system which includes a photographing lens and an adjustable diaphragm, wherein said controller controls an aperture size of said adjustable diaphragm.

13. The camera according to claim 11, wherein said photographing system comprises an image-sensor mover which linearly moves said image sensor in directions orthogonal to an optical axis of said photographing optical system and rotates about an axis parallel to said optical axis based on said moving direction and said moving speed of said celestial object image.

14. The method according to claim 1, wherein the preliminary image obtained during the preliminary photographing operation is not used in the automatically tracking and photographing the celestial object.

* * * * *